United States Patent
Specht et al.

(10) Patent No.: US 9,893,390 B2
(45) Date of Patent: Feb. 13, 2018

(54) BATTERY PACK INCLUDING AN INDICATOR CIRCUIT

(71) Applicant: DURACELL U.S. OPERATIONS, INC., Wilmington, DE (US)

(72) Inventors: Steven Jeffrey Specht, Brookfield, CT (US); Jordan Todorov Bourilkov, Bethany, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 590 days.

(21) Appl. No.: 14/469,776

(22) Filed: Aug. 27, 2014

(65) Prior Publication Data

US 2016/0064781 A1    Mar. 3, 2016

(51) Int. Cl.
| | |
|---|---|
| *H01M 14/00* | (2006.01) |
| *H01M 2/18* | (2006.01) |
| *H01M 2/02* | (2006.01) |
| *H01M 10/48* | (2006.01) |
| *H01M 2/10* | (2006.01) |
| *H01M 10/42* | (2006.01) |

(52) U.S. Cl.
CPC ....... *H01M 10/488* (2013.01); *H01M 2/1022* (2013.01); *H01M 10/4257* (2013.01); *H01M 10/482* (2013.01)

(58) Field of Classification Search
CPC .. H01M 14/00; H01M 2/1016; H01M 10/425; H01M 2010/4278; H01M 2/34; H01M 6/0534

See application file for complete search history.

(56) References Cited

U.S. PATENT DOCUMENTS

| | | | |
|---|---|---|---|
| 7,745,046 B2 * | 6/2010 | Kim | H01M 2/06 429/136 |
| 2007/0229281 A1 | 10/2007 | Shionoiri et al. | |
| 2010/0209744 A1 * | 8/2010 | Kim | H01M 2/0267 429/8 |
| 2013/0059182 A1 | 3/2013 | Komatsu et al. | |
| 2013/0127611 A1 | 5/2013 | Bernstein et al. | |
| 2013/0148283 A1 | 6/2013 | Forutanpour et al. | |

FOREIGN PATENT DOCUMENTS

WO    WO 2013/022857 A3    2/2013

OTHER PUBLICATIONS

PCT International Search Report with Written Opinion in corresponding international application PCT/US2015/045456 dated Oct. 27, 2015.

* cited by examiner

*Primary Examiner* — Ula C Ruddock
*Assistant Examiner* — Julian Anthony
(74) *Attorney, Agent, or Firm* — Marshall, Gerstein & Borun LLP

(57) ABSTRACT

The invention is directed toward a battery pack. The battery pack includes at least one electrochemical cell; a case; a plate; an indicator circuit; and a battery-to-internal volume ratio. The case includes at least one open end. The plate is placed over the at least one open end. The plate includes a terminal plate, a base plate, or any combination thereof. The indicator circuit includes an integrated circuit and an antenna. The indicator circuit is affixed to the plate. The battery-to-internal volume ratio is greater than about 0.52.

9 Claims, 11 Drawing Sheets

BATTERY PACK INCLUDING AN INDICATOR CIRCUIT

FIELD OF THE INVENTION

The invention relates to a battery pack including an indicator circuit.

BACKGROUND OF THE INVENTION

Wireless communications, including radio frequency identification (RFID) and other near field communication (NFC) protocols, are gaining in popularity for applications such as security, inventory management, access control, and the like. The number of smart phones that include RFID or NFC protocols is growing along with the various applications of passive or active transponders, such as RFID circuits and NFC circuits. Such communications circuits may be coupled with an antenna that modulates, and in some instances emits, a wireless communication signal that can be read by a reader, such as a smartphone.

Electrochemical cells, or batteries, are commonly used as electrical energy sources. An electrochemical cell contains a negative electrode, typically called the anode, and a positive electrode, typically called the cathode. The anode contains an active material that can be oxidized. The cathode contains an active material that can be reduced. The anode active material is capable of reducing the cathode active material. A separator is disposed between the anode and cathode. An electrolyte is also included within the electrochemical cell. The aforementioned components are generally disposed in a can. A battery pack may include at least one electrochemical cell within a case. The battery pack may have specified external dimensions that, in part, limit the internal volume of the case available for the at least one electrochemical cell and other battery pack components.

Battery testers may be used to determine characteristics of a battery, or a battery pack, such as the remaining battery capacity. An exemplary type of a common battery tester that is placed on a battery is known as a thermochromic-type tester. In a thermochromic battery tester, a circuit may be completed by a consumer manually depressing one or two button switches. Once the circuit is completed, the consumer has electrically connected the battery to the thermochromic tester. The thermochromic tester may include a silver resistor, e.g., a flat silver layer that has a variable width so that the electrical resistance also varies along its length. As current travels through the silver resistor, the dissipated power generates heat that changes the color of a thermochromic ink display that is placed over the silver resistor. The thermochromic ink display may be arranged as a gauge to indicate the relative capacity of the battery. However, it is typically necessary for the consumer to inconveniently hold the battery and/or remove the battery from the device in order to test the battery using the battery tester.

Accordingly, there exists a need for a battery pack including an indicator circuit that does not require manual interaction between the consumer and the battery pack. In addition, the battery pack including an indicator circuit may also include advanced processing and communication capabilities. There also exists a need for a battery pack including an indicator circuit that does not detrimentally reduce the internal volume of the case that is available for the at least one electrochemical cell and other battery pack components.

SUMMARY OF THE INVENTION

The invention is directed toward a battery pack. The battery pack includes at least one electrochemical cell; a case; a plate; an indicator circuit; and a battery-to-internal volume ratio. The case includes at least one open end. The plate is placed over the at least one open end. The plate includes a terminal plate, a base plate, or any combination thereof. The indicator circuit includes an integrated circuit and an antenna. The indicator circuit is affixed to the plate. The battery-to-internal volume ratio is greater than about 0.52.

In another embodiment, the invention is directed toward a battery pack. The battery pack includes at least one electrochemical cell; a case; a plate; an indicator circuit; and a battery-to-internal volume ratio. The case includes an open end, a closed end, and a sidewall therebetween. The plate is placed over the one open end. The plate is a terminal plate. The indicator circuit includes an integrated circuit and an antenna. The indicator circuit is affixed to the closed end of the case. The battery-to-internal volume ratio is greater than about 0.52.

BRIEF DESCRIPTION OF THE DRAWINGS

While the specification concludes with claims particularly pointing out and distinctly claiming the subject matter, which is regarded as forming the present invention, it is believed that the invention will be better understood from the following description taken in conjunction with the accompanying drawings.

DETAILED DESCRIPTION OF THE INVENTION

Figure 1:
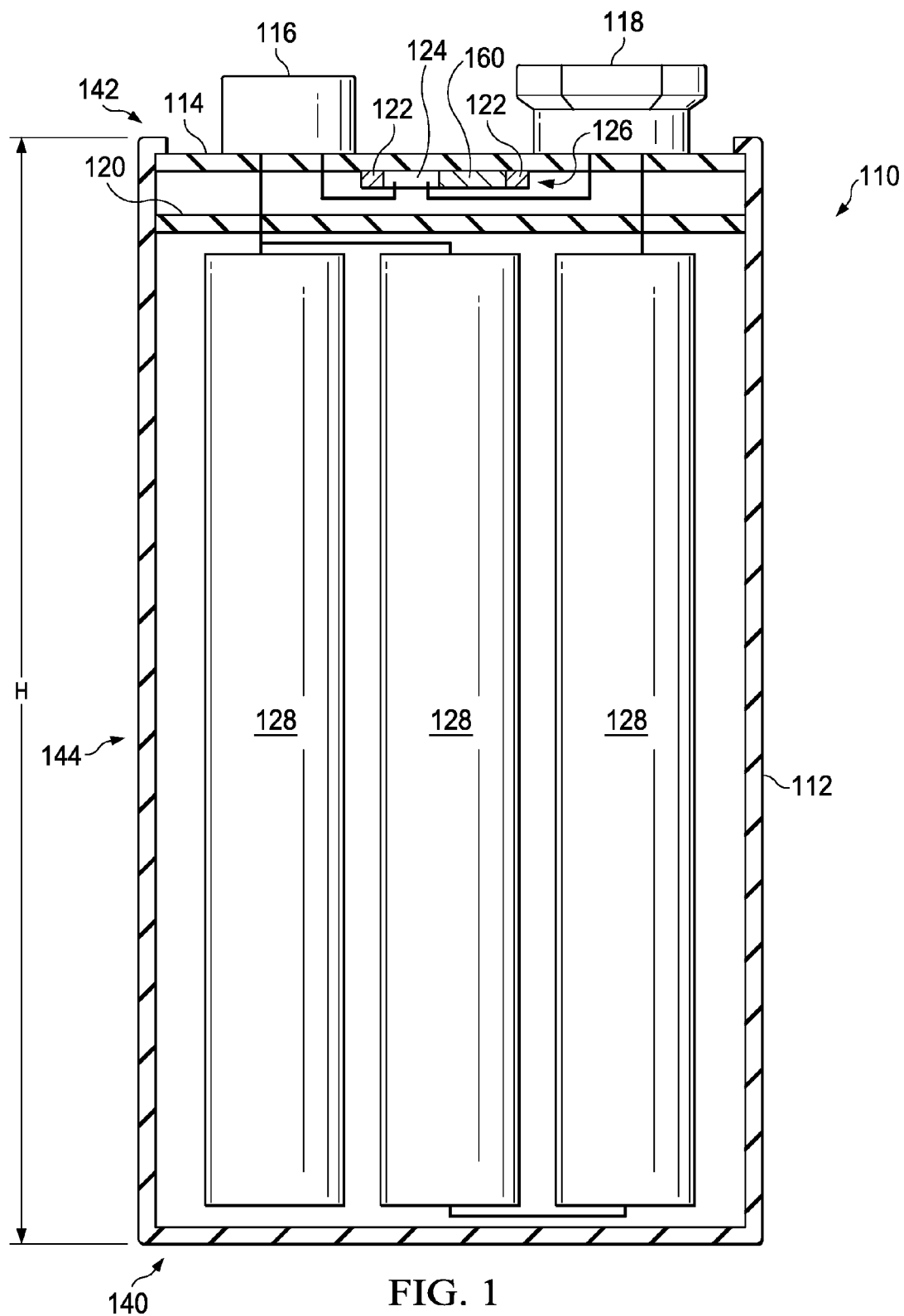
FIG. 1 is a cross-section along the length of an embodiment of a battery pack including an indicator circuit of one or more of the embodiments shown and described herein.

The present invention is directed towards a battery pack including an indicator circuit. The battery pack includes at least one electrochemical cell, or battery, within a case. The indicator circuit is capable of sending and/or receiving a wireless communication signal. The indicator circuit includes an integrated circuit (IC) and an antenna. The indicator circuit may be electrically coupled to the at least one electrochemical cell. The indicator circuit may wirelessly communicate characteristics of the at least one electrochemical cell, such as voltage or capacity, to a reader, such as a smartphone.

The electrochemical cell is a device that is capable of converting chemical energy within the active materials of the electrochemical cell by means of an electrochemical reduction-oxidation (redox) reaction. David Linden, *Handbook of Batteries*, 1.3 (4$^{th}$ ed. 2011). The electrochemical cell consists of an anode, a cathode, and an electrolyte. Id. One or more electrochemical cells may be referred to as a battery. Electrochemical cells, or batteries, may be primary or secondary. Primary batteries are meant to be discharged, e.g., to exhaustion, only once and then discarded. Primary batteries are described, for example, in David Linden, *Handbook of Batteries* (4$^{th}$ ed. 2011). Secondary batteries are intended to be recharged. Secondary batteries may be discharged and recharged many times, e.g., more than fifty times, a hundred times, or more. Secondary batteries are described, for example, in David Linden, *Handbook of Batteries* (4$^{th}$ ed. 2011). Accordingly, batteries may include various electrochemical couples and electrolyte combinations. It should be appreciated that the invention applies to both primary and secondary batteries of aqueous, nonaqueous, ionic liquid, and solid state systems that are included within the battery pack. Battery packs including primary and secondary batteries of the aforementioned systems are thus within the scope of this application and the invention is not limited to any particular embodiment.

Battery packs are available in varying sizes and dimensions. The International Electrotechnical Commission (IEC) and the American National Standards Institute (ANSI), for example, have established standard sizes and dimensions for batteries and battery packs available to consumers at retail. The IEC has set standard sizes and dimensions, for example, for battery packs, such as what is commonly referred to as a 9V alkaline battery pack. A 9V battery pack, for example, has a prismatic, or rectangular, shape with a maximum height of about 48.5 mm; a maximum length of about 26.5 mm; and a maximum width of about 17.5 mm. In addition, individual battery or device manufacturers may designate the dimensions for battery packs that may not be generally available at retail, such as lithium ion prismatic batteries. Prismatic batteries of this type may have a height of less than about 5 mm; a length of less than about 42 mm; and a width of less than about 34 mm. It should be appreciated that the present invention applies to battery packs of various sizes and dimensions set by the IEC or ANSI, such as an ANSI 1604 battery pack; an ANSI 7.2H5 battery pack; an ANSI 7.2K5 battery pack; an ANSI 8.4H5 battery pack; and an ANSI 8.4K5 battery, as well as battery pack sizes and dimensions that are designated by individual battery or device manufacturers.

The case may have any suitable shape, for example, a prismatic shape, an oval shape, a polygonal shape with rounded edges, or any other suitable shape. The case may have a prismatic shape, for example, a shape comprising at least two parallel plates, such as a shape that is rectangular or square. The case may be of any conventional type commonly used for battery packs. The case may be made of any suitable material. The material may be, for example, a flexible metal, such as aluminum, aluminum alloy, stainless steel, nickel-plated steel (pre or post-plated), or the like. The material may also be, for example, a non-conductive and non-magnetic material, such as plastic, polymer, or the like. The case should have sufficient dimensions and internal volume to include the at least one electrochemical cell and the indicator circuit.

The case may be formed via a stamping process, such as deep-drawing. The case may be formed via a molding process, such as injection molding. The case may be formed into, for example, two halves that may be brought together to form a complete case, such a case may be referred to as a clam-shell case. The case may include at least one open end. The case may have a closed end that is integrally formed within the case when the case is formed by, for example, either deep drawing or injection molding. The closed end may be opposite the open end of the case. The case may include a first open end and a second open end. The case may include a sidewall that runs from the open end to the closed end of the case. The case may include a sidewall that runs from the first open end of the case to the second open end of the case. The sidewall may have a height H. A plate may be placed over the at least one open end. The plate may be a terminal plate or a base plate.

The terminal plate may be placed over the at least one open end of the case to close the battery pack. In some embodiments, such as when the battery pack includes the clam-shell case, the terminal plate may be placed over the first open end of the case. The terminal plate may be made from any suitable material. The material may be, for example, a flexible metal, such as aluminum, aluminum alloy, stainless steel, nickel-plated steel (pre or post-plated), or the like. The material may also be, for example, a non-conductive and non-magnetic material, such as plastic, polymer, or the like. The terminal plate may be formed by any suitable process, such as stamping or injection molding. The terminal plate may include a positive battery pack terminal and a negative battery pack terminal. The positive battery pack terminal and the negative battery pack terminal may be made from any suitable material that is conductive. The material may be metal, such as nickel, nickel-plated steel, stainless steel, brass, or the like. The positive battery pack terminal and the negative battery pack terminal may be optionally plated with nickel, gold, brass, or another suitable material presenting a low electrical-contact resistance between the positive battery pack terminal and the negative battery pack terminal and, for example, the electrical contacts within a device to which the positive battery pack terminal and the negative battery pack terminal are in electrical connection with the device.

A portion of the sidewall of the case may extend past the terminal plate when the terminal plate is seated within the at least one open end of the case. The portion of the sidewall of the case extending past the seated terminal plate can be crimped over the terminal plate to seal the case of the battery pack closed. Alternatively, the terminal plate may be placed within, for example, the two halves of a clam-shell case. The two halves of the clam-shell case may be welded, for example ultrasonically welded, to close the battery pack.

In some embodiments, such as when the battery pack includes the clam-shell case, the base plate may be used. The base plate may be placed over the second open end of the case to close the second open end of the case to form the battery pack. The base plate may be made from any suitable material. The material may be, for example, a flexible metal, such as aluminum, aluminum alloy, stainless steel, nickel-plated steel (pre or post-plated), or the like. The material may also be, for example, from a non-conductive and non-magnetic material, such as plastic, polymer, or the like. The base plate may be formed by any suitable process, such as stamping or injection molding.

The base plate may be placed over the second open end of the case. A portion of the sidewall of the case may extend past the base plate when the base plate is seated within the second open end of the case. The portion of the sidewall of the case extending past the seated base plate can be crimped over the base plate to seal the case of the battery pack closed. Alternatively, the base plate may be placed within, for example, the two halves of the clam-shell case. The two halves of the clam-shell case may be welded, for example ultrasonically welded, to close the battery pack.

The indicator circuit may include the integrated circuit (IC) and the antenna. The IC may include a circuit of transistors, resistors, diodes, inductors, and/or capacitors constructed on a single substrate, such as a semiconductor wafer or chip, or a metal, polymer, or ceramic substrate, in which the discreet components are interconnected to perform a given function. The IC may comprise a communications circuit and/or an analog-to-digital converter (ADC) electrically coupled together to perform a function, or any number of functions. The IC may be electrically connected to a system ground in order for the IC to perform its function(s). The IC may include circuits that include, but not be limited to, an indication circuit; a power circuit; a communications circuit, such as an RFID circuit or block or a NFC circuit or block; an input/output circuit or port; and the like. The IC may physically co-locate, for example, the communications circuit and ADC side-by-side or physically integrate them together. The IC may also comprise an application specific integrated circuit (ASIC) that is specifically manufactured to encompass the performance of the function, or any number of functions, that are required. The function may be, for example, to determine a specified condition of the at least one electrochemical cell within the battery pack or the battery pack and relay that information to the reader in the form of function information. The function may also be, for example, to signally communicate a notification of the specific condition of the at least one electrochemical cell within the battery pack or the battery pack. The function may be, for example, to provide an indication of the specified condition of the at least one electrochemical cell within the battery pack or the battery pack which may include audible, visible, or pallesthesia indications. Pallesthesia is the ability to sense a vibration and a pallesthesia indication is a mechanical or electromechanical means to provide the sense of vibration.

The IC may be of any suitable shape. The IC may have a rectangular or square shape with a length, a width, and a height. The IC may be active, semi-active, battery-assisted passive, or may be passive. The length of the IC may be less than about 3 mm, for example between about 1.0 mm to about 2.0 mm. The width of the IC may be less than about 3 mm, for example between about 0.5 mm and about 2 mm. The height of the IC may be less than about 1.0 mm, for example between about 0.02 mm and about 0.10 mm.

The communications circuit may be any suitable communications circuitry such as radio-frequency identification (RFID) circuitry and near field communication (NFC) circuitry as included within, for example, ISO/IEC 14443 (proximity cards), 15693 (vicinity cards), 15961, 15962, 15963, and 18000 communication standards; Bluetooth circuitry as included within, for example, IEEE 802.15.1 communication standard; Bluetooth Low Energy, or Bluetooth Smart, circuitry as included within, for example, IEEE 802.15.6 communications standard; Wi-Fi circuitry as included within, for example, IEEE 802.11 communication standard; Zigbee circuitry as included within, for example, IEEE 802 communication standard; and any suitable fixed wireless communication circuitry. The communications circuit may utilize any suitable frequency bands such as low-frequency (from about 125 kHz to about 134.2 kHz and from about 140 kHz to about 148.5 kHz); high frequency (HF) (13.56 MHz); ultra-high frequency (UHF) (860-956 MHz); or microwave frequency (2.4-5.8 GHz). In addition, other communications circuitry may be used, such as audible or inaudible sound or visible light.

The antenna may include at least one antenna trace that may define a single antenna or multiple antennas. The antenna may be a single ended antenna, a dipole antenna, a loop antenna, or any other suitable type of antenna. The loop antenna, for example, may include one or more turns or windings of the at least one antenna trace. The at least one antenna trace may include a first antenna terminal and a second antenna terminal. The first antenna terminal and the second antenna terminal may provide joint connections for solder, conductive adhesive, ultrasonic welding, thermosonic bonding, thermo-compression bonding, or crimping, for example, to the integrated circuit (IC). The first antenna terminal and the second antenna terminal may be electrically coupled to the IC.

The antenna may include any number of loops required to achieve the desired read range of the communications circuit. The corresponding IC input capacitance and antenna inductance must be accounted for in deciding how many loops and/or how many turns per loop may be used to provide a LC (inductance and capacitance) tank circuit with a tunability range to meet the communications circuit and reader resonance frequencies.

The at least one antenna trace, the first antenna terminal, and the second antenna terminal may be made from copper, aluminum, silver, gold, or other conductive metals. Other examples include conductive polymers, conductive glues, and conductive carbon, such as graphite. The at least one antenna trace, the first antenna terminal, and the second antenna terminal may be printed or painted. The at least one antenna trace of the antenna may be printed by a machine that defines the antenna through the use of screen, gravure, or ink jet printing to apply the material onto a subject surface. The printing may be completed via RF sputtering techniques; impact or pressure techniques that define material on the subject surface; metal foil mask techniques; and etch techniques, or heat or light activation techniques that activate the material that is applied to the subject surface.

The at least one antenna trace, the first antenna terminal, and the second antenna terminal may be made from foil. The at least one antenna trace, the first antenna terminal, and the second antenna terminal may be a pre-formed wire that is either insulated or bare. If the pre-formed wire is bare, it may be covered by a non-conductive sheet, a non-conductive tape, a non-conductive flexible substrate, or a non-conductive shrink wrap.

The at least one electrochemical cell may have a positive terminal and a negative terminal. The IC may be electrically coupled, in series, parallel, or a combination thereof, to the positive terminal and the negative terminal of the battery. For example, a conducting trace, such as a lead, may connect the negative terminal of the battery to the IC. Similarly, a conducting trace, such as a lead, may connect the positive terminal of the battery to the IC. The conducting trace can be formed from any suitable material that is electrically conductive, such as conductive polymers; conductive glues; conductive carbon, such as graphite; and conductive metals, such as aluminum, nickel, silver, copper, gold, and tin. The conducting trace may be printed directly on the battery; may be a thin metal wire affixed to the battery; may be a thin insulated wire attached to the battery; or any other suitable form that provides electrical connection from the positive terminal of the battery to the IC and from the negative terminal of the battery to the IC. The conducting trace may be electrically isolated from the metal can of the battery. For example, the conducting trace may extend from the IC to the negative terminal of the battery and remain electrically isolated from the battery till it is electrically coupled to the negative terminal of the battery. Similarly, the conducting trace may extend from the IC to the positive terminal of the battery and remain electrically isolated from the battery till it is electrically coupled to the positive terminal of the battery. The conducting trace may be coupled to the positive terminal and the negative terminal of the battery, for example, by a conductive adhesive, such as a silver epoxy, by ultrasonic welding, by resistance welding, by laser welding, or by mechanical pressure.

The IC of the indicator circuit may perform any number of functions with respect to the at least one electrochemical cell within the battery pack. The IC may provide function information regarding: power output of the at least one electrochemical cell or the battery pack; rate of discharge of the at least one electrochemical cell or the battery pack; when the at least one electrochemical cell or the battery pack is nearing the end of its useful life; and state of charge of the at least one electrochemical cell or the battery pack. The IC may also provide: over-discharge protection; over-charge protection; remaining capacity determination; voltage determination; cycle life determination; and power management. Power management functions may include battery pack identification; battery pack state of health; battery pack protection; cell balancing; fuel gauging; charge control; voltage conversion; load regulation; powering the battery pack on/off; power setting adjustment; allow or prevent recharging; battery pack by-pass; temperature monitoring; and charging rate adjustment. The IC may be used, for example, in a battery pack including an indicator circuit to provide information about the battery pack to, for example, the consumer through the use of the reader, such as a smartphone. The IC may also be configured with a unique identifier, such as an RFID circuit equivalent, that indicates either a unique sequence of numbers/symbols or information such as, for example, manufacturing date, lot number, serial number, and the other identifiable information of the battery pack.

The battery pack including an indicator circuit may also include a magnetic diverter if, for example, the can of the at least one electrochemical cell within the battery pack, or if the case of the battery pack, is metal. The magnetic diverter may be any material with high magnetic permeability at a specified frequency and with low electrical conductivity. The magnetic diverter may be, for example, a thin, flexible, ferrite material, such as iron or iron alloys with a body centered cubic crystal structure. Other materials may be used as the magnetic diverter which provide a high magnetic permeability such as, for example, nickel, or cobalt and their corresponding alloys. Other materials for the magnetic diverter also include oxides which are not substantially electrically conductive. The magnetic diverter may be, for example, about 30 micrometers to about 300 micrometers thick.

The magnetic diverter may shield the antenna of the indicator circuit from metal components within the battery pack, such as the case and the metal can of the at least one electrochemical cell. The magnetic diverter may be, for example, placed between the antenna and the at least one electrochemical cell. The magnetic diverter may be a film affixed, for example, to the surface of the antenna and/or the integrated circuit. The magnetic diverter may be painted or coated on the surface of the antenna and/or the integrated circuit. The magnetic diverter may be a film affixed to the internal surface of the case. The magnetic diverter may be painted or coated on the internal surface of the case.

The IC may be affixed to, or integral within, the terminal plate, the base plate, or the case. The IC may be affixed to, or integral within, a printed circuit board (PCB). The IC can be affixed to the terminal plate, the base plate, the case, or the PCB by an adhesive or a weld. Suitable adhesives include glues, epoxies, and any other suitable adhesive that is, for example, thermally conductive and electrically insulating. Suitable welding methods include pressure bonding, ultrasonic welding, and combinations thereof or any other acceptable welding processes. The IC may be encapsulated in a protective material, such as an epoxy, prior to or after being affixed to the terminal plate, the base plate, the case, or the PCB.

The PCB may be affixed to, or integral within, the terminal plate, the base plate, or the case. The PCB, on or within which a wiring pattern or circuit may be formed, may include a plurality of safety devices, power terminals, external connection terminals, and the like that provide functional features, such as communication, antenna(e), and thermal heat sinks. The PCB may comprise one or more layers, each having its own wiring pattern and such a PCB may be referred to as a multi-layer PCB. The wiring pattern may comprise conductive traces or conductive foil traces. A multi-layer PCB may comprise vias between layers to provide electrical connection between their wiring patterns. Examples of safety devices may include a protective module, a positive-temperature-coefficient (PTC) thermistor, and the like. The protective module may include, for example, a switching device, a control-circuit unit, a resistor, a capacitor, a fuse, and the like. Examples of power terminals and external-connection terminals may include PCB contact pads.

The PCB may be electrically coupled with the at least one electrochemical cell. The PCB may be electrically coupled to the at least one electrochemical cell in series, parallel, or any combination thereof. For example, conducting traces or a flexible circuit can connect the negative terminal of the at least one electrochemical cell to the PCB and the positive terminal of the at least one electrochemical cell to the PCB. The conducting traces can be formed from any suitable material that is electrically conductive, such as conductive polymers, conductive glues, conductive carbon, such as graphite, and conductive metals, such as aluminum, nickel, silver, copper, gold, and tin. The conducting traces may be printed directly on the at least one electrochemical cell; may be a thin metal wire affixed to the at least one electrochemical cell; may be a thin insulated wire attached to the at least one electrochemical cell; or any other suitable form that provides electrical connection from one terminal of the at least one electrochemical cell to the PCB and the other terminal of the at least one electrochemical cell to the PCB.

The battery pack may also include an insulator. The insulator may be placed, for example, between the indicator circuit and the at least one electrochemical cell. The insulator may be made from a suitable material and in any suitable shape to prevent, for example, the at least one electrochemical cell from contacting the indicator circuit. The insulator may be made of any suitable, insulative material, such as plastic, paper, ceramic, fiber board, composites thereof, and any combinations thereof.

The at least one electrochemical cell within the battery pack may have a volume. The at least one electrochemical cell within the battery pack may occupy a total volume. The battery pack may have an internal volume. The internal volume of the battery pack may be defined as the space that is bounded by, for example, the terminal plate that is placed over the open end of the case; the sidewall of the case; and the closed end of the case. The internal volume of the battery pack may alternatively be defined as the space that is bounded by, for example, the terminal plate that is placed over the first open end of the case; the base plate that is placed over the second open end of the case; and the sidewall of the case. A ratio of the total volume that is occupied by the at least one electrochemical cell to the internal volume of the battery pack may be referred to as the battery-to-internal volume ratio of the battery pack. The volume occupied by the at least one electrochemical cell; the total volume occupied by the at least one electrochemical cell; the internal volume of the battery pack; and the battery-to-internal volume ratio will be fixed by the design of the battery pack and may be calculated by a battery pack designer using, for example, a computer-aided design (CAD) program.

The total volume of the at least one electrochemical cell within the battery pack may be at least about 11.2 cm$^3$. The total volume of the at least one electrochemical cell within the battery pack may be, for example, from about 11.2 cm$^3$ to about 21.0 cm$^3$. The internal volume of the battery pack may be less than about 21.5 cm$^3$. The internal volume of the battery pack may be, for example, from about 11.4 cm$^3$ to about 21.0 cm$^3$. The battery-to-internal volume ratio may be greater than about 0.52. The battery-to-internal volume ratio may be, for example, from about 0.52 to about 0.98.

An ANSI 1604 9V primary alkaline battery pack, for example, may include a battery pack that has an internal volume of about 17.8 cm$^3$. The 9V primary battery pack may also include six cylindrical primary electrochemical cells. Each individual cylindrical primary electrochemical cell may have a volume of about 1.9 cm$^3$. The total volume of the six cylindrical primary electrochemical cells may be about 11.4 cm$^3$ (6 electrochemical cells·1.9 cm$^3$/electrochemical cell). The battery-to-internal volume ratio of the ANSI 1604 9V primary alkaline battery pack may be about 0.64 (11.4 cm$^3$/17.8 cm$^3$).

An ANSI 1604 9V primary alkaline battery pack, for example, may include a battery pack that has an internal volume of about 17.5 cm$^3$. The ANSI 1604 9V primary battery may include six prismatic primary electrochemical cells. Each individual prismatic primary electrochemical cell may have a volume of about 2.6 cm$^3$. The total volume of the six prismatic primary electrochemical cells may be about 15.6 cm$^3$ (6 electrochemical cells·2.6 cm$^3$/electrochemical cell). The battery-to-internal volume ratio of the 9V primary alkaline battery pack may be about 0.89 (15.6 cm$^3$/17.5 cm$^3$).

The reader may be any device capable of reading the indicator circuit. Specific examples of the reader include a smartphone, tablet, personal computer (PC) with NFC adapter, dedicated RFID indicator circuit reader, a dedicated NFC indicator circuit reader, a handheld computing device, or a wand antenna electrically coupled to a computing device. The reader may be used to excite the IC by transmitting an interrogation signal or may transmit a "wake-up" signal to the IC. The interrogation signal may be, for example, a RF pulse of a predetermined frequency used to energize the circuit in the IC and provide power to the IC to transmit its function information. The "wake-up" signal may, for example, be a RF pulse, but the IC may use power from another source to power the IC and to transmit its function information. The IC may periodically send a signal or may send a signal based upon the change of the function information that may be read by the reader. The reader may include a display to visibly present the function information or an audible device capable of audibly presenting the function information. The reader may also include algorithms to interpret and/or modify the function information before presenting.

Referring to FIG. 1, an exemplary battery pack 110 is shown. The battery pack 110 includes a case 112; a terminal plate 114; a positive battery pack terminal 116; a negative battery pack terminal 118; an insulator 120; an indicator circuit 126; and at least one electrochemical cell 128. The indicator circuit 126 includes an antenna 122; an integrated circuit (IC) 124; and a communications circuit 160. The case 112 includes a closed end 140, an open end 142, and a sidewall 144 therebetween. The sidewall 144 has a height H. The terminal plate 114 is placed over the open end 142 of the case 112. The indicator circuit 126 is affixed to the terminal plate 114 of the case 112. The indicator circuit 126 is in electrical communication with the at least one electrochemical cell 128. The at least one electrochemical cell 128 is in electrical communication with the positive battery pack terminal 116 and the negative battery pack terminal 118.

Figure 2:
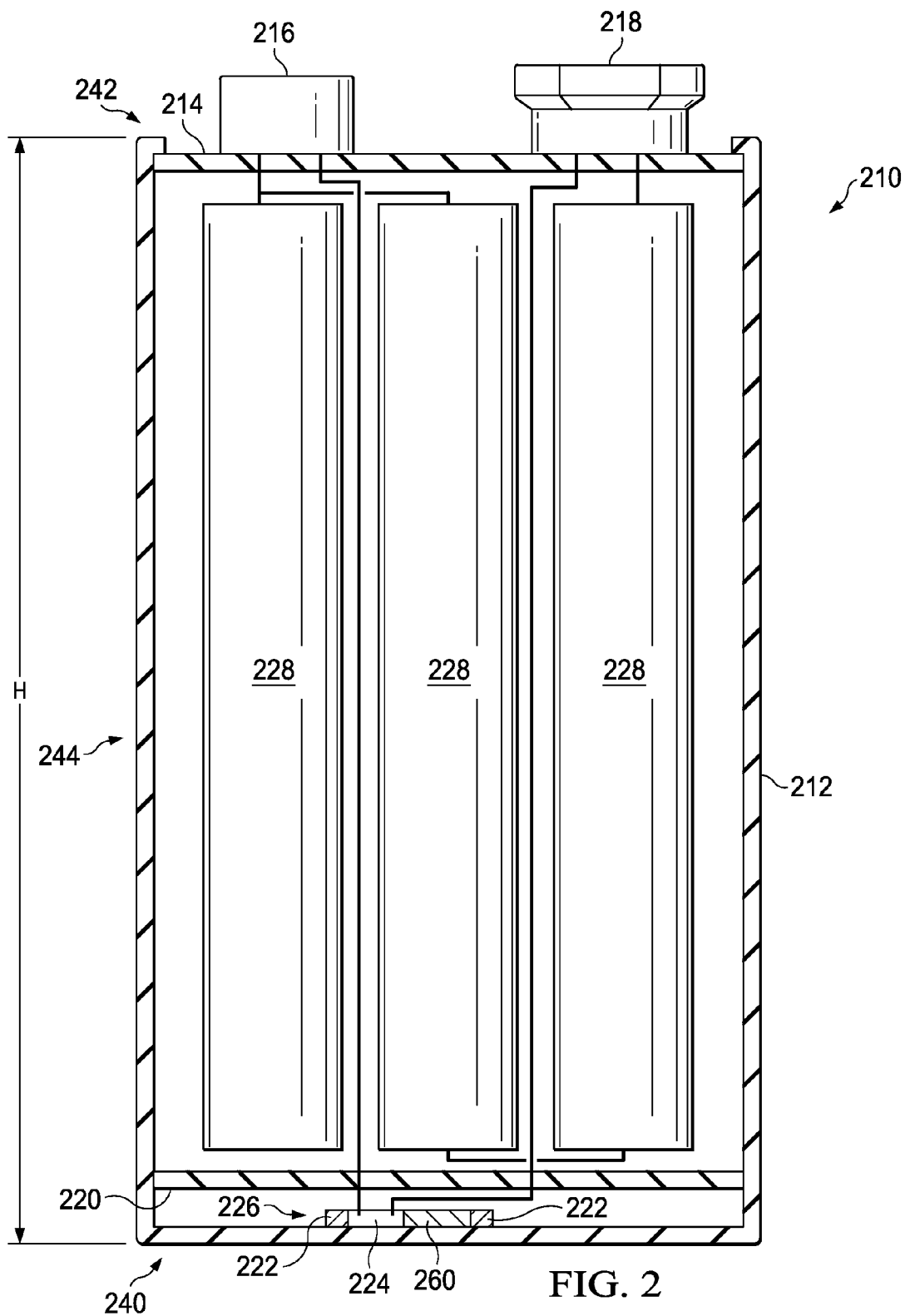
FIG. 2 is a cross-section along the length of an embodiment of a battery pack including an indicator circuit of one or more of the embodiments shown and described herein.

Referring to FIG. 2, an exemplary battery pack 210 is shown. The battery pack 210 includes a case 212; a terminal plate 214; a positive battery pack terminal 216; a negative battery pack terminal 218; an insulator 220; an indicator circuit 226; and at least one electrochemical cell 228. The indicator circuit 226 includes an antenna 222; an integrated circuit (IC) 224; and a communications circuit 260. The case 212 includes a closed end 240, an open end 242, and a sidewall 244 therebetween. The sidewall 244 has a height H. The terminal plate 214 is placed over the open end 242 of the case 212. The indicator circuit 226 is affixed to the closed end 240 of the case 212. The indicator circuit 226 is in electrical communication with the at least one electrochemical cell 228. The at least one electrochemical cell 228 is in electrical communication with the positive battery pack terminal 216 and the negative battery pack terminal 218.

Figure 3:
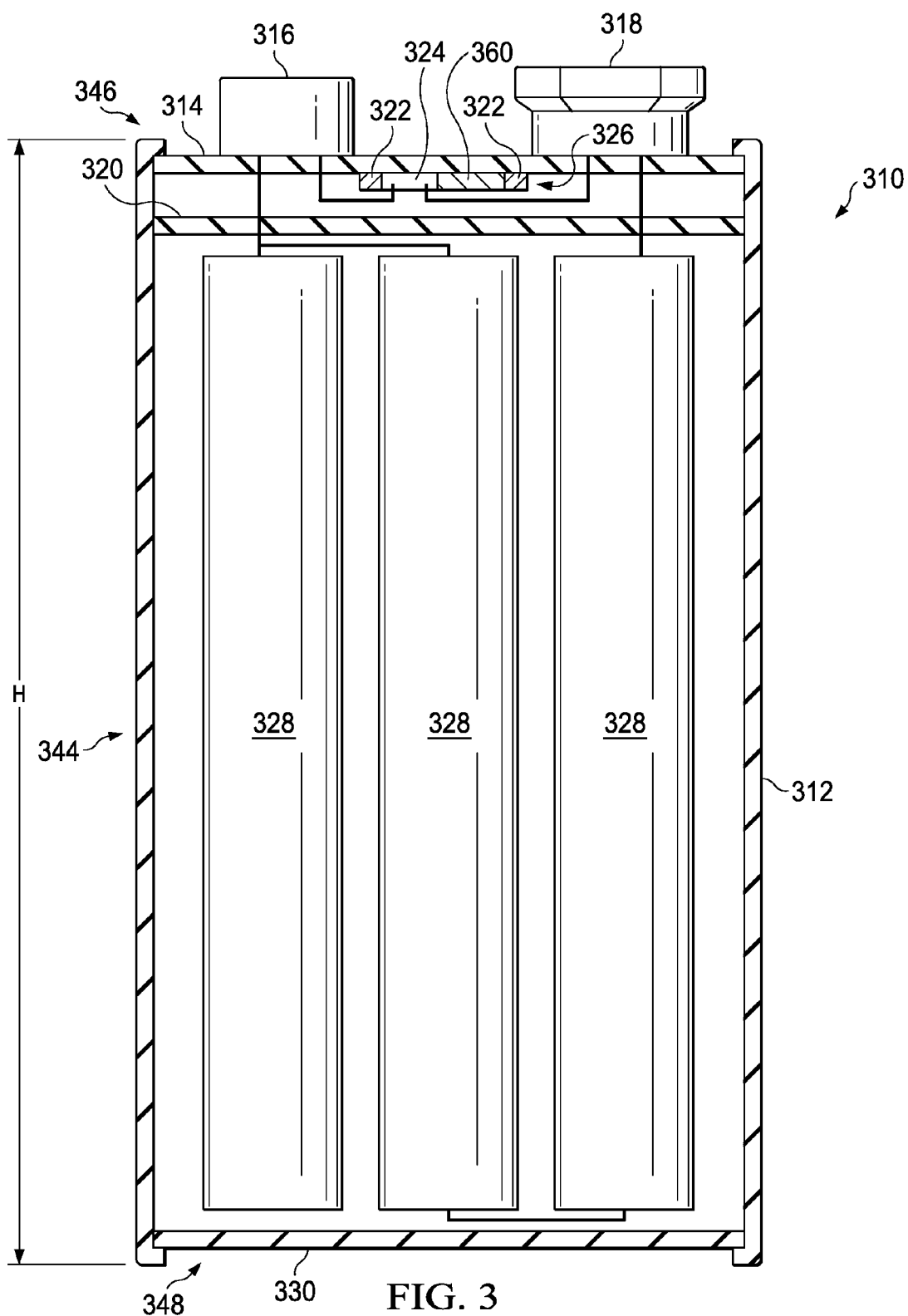
FIG. 3 is a cross-section along the length of an embodiment of a battery pack including an indicator circuit of one or more of the embodiments shown and described herein.

Referring to FIG. 3, an exemplary battery pack 310 is shown. The battery pack 310 includes a case 312; a terminal plate 314; a base plate 330; a positive battery pack terminal 316; a negative battery pack terminal 318; an insulator 320; an indicator circuit 326; and at least one electrochemical cell 328. The indicator circuit 326 includes an antenna 322; an integrated circuit (IC) 324; and a communications circuit 360. The case 312 includes a first open end 346, a second open end 348, and a sidewall 344 therebetween. The sidewall 344 has a height H. The terminal plate 314 is placed over the first open end 346 of the case 312. The base plate 330 is placed over the second open end 348 of the case 312. The indicator circuit 326 is affixed to the terminal plate 314. The indicator circuit 326 is in electrical communication with the at least one electrochemical cell 328. The at least one electrochemical cell 328 is in electrical communication with the positive battery pack terminal 316 and the negative battery pack terminal 318.

Figure 4:
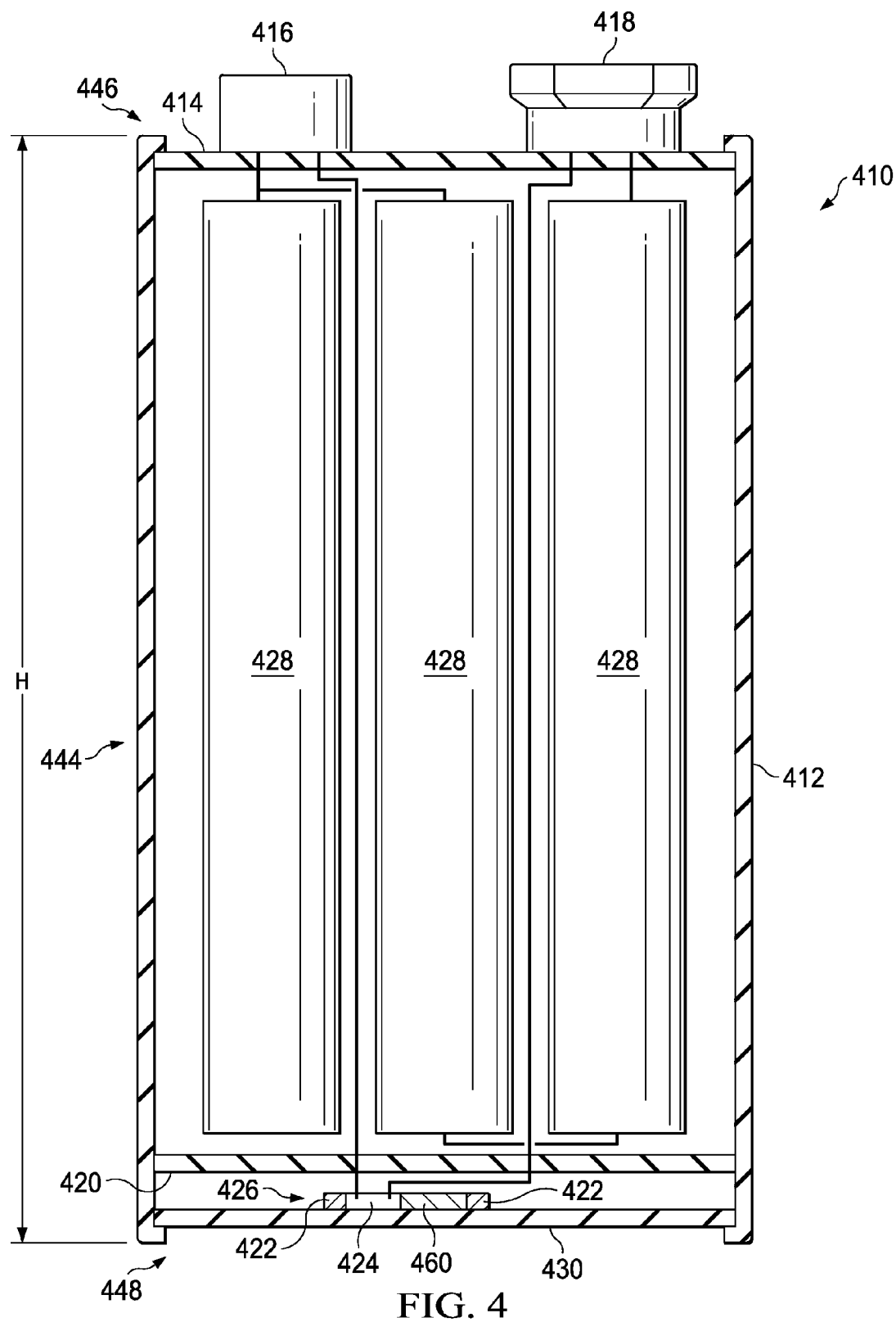
FIG. 4 is a cross-section along the length of an embodiment of a battery pack including an indicator circuit of one or more of the embodiments shown and described herein.

Referring to FIG. 4, an exemplary battery pack 410 is shown. The battery pack 410 includes a case 412; a terminal plate 414; a base plate 430; a positive battery pack terminal 416; a negative battery pack terminal 418; an insulator 420; an indicator circuit 426; and at least one electrochemical cell 428. The indicator circuit 426 includes an antenna 422; an integrated circuit (IC) 424; and a communications circuit 460. The case 412 includes a first open end 446, a second open end 448, and a sidewall 444 therebetween. The sidewall 444 has a height H. The terminal plate 414 is placed over the first open end 446 of the case 412. The base plate 430 is placed over the second open end 448 of the case 412. The indicator circuit 426 is affixed to the base plate 430. The indicator circuit 426 is in electrical communication with the at least one electrochemical cell 428. The at least one electrochemical cell 428 is in electrical communication with the positive battery pack terminal 416 and the negative battery pack terminal 418.

Figure 5:
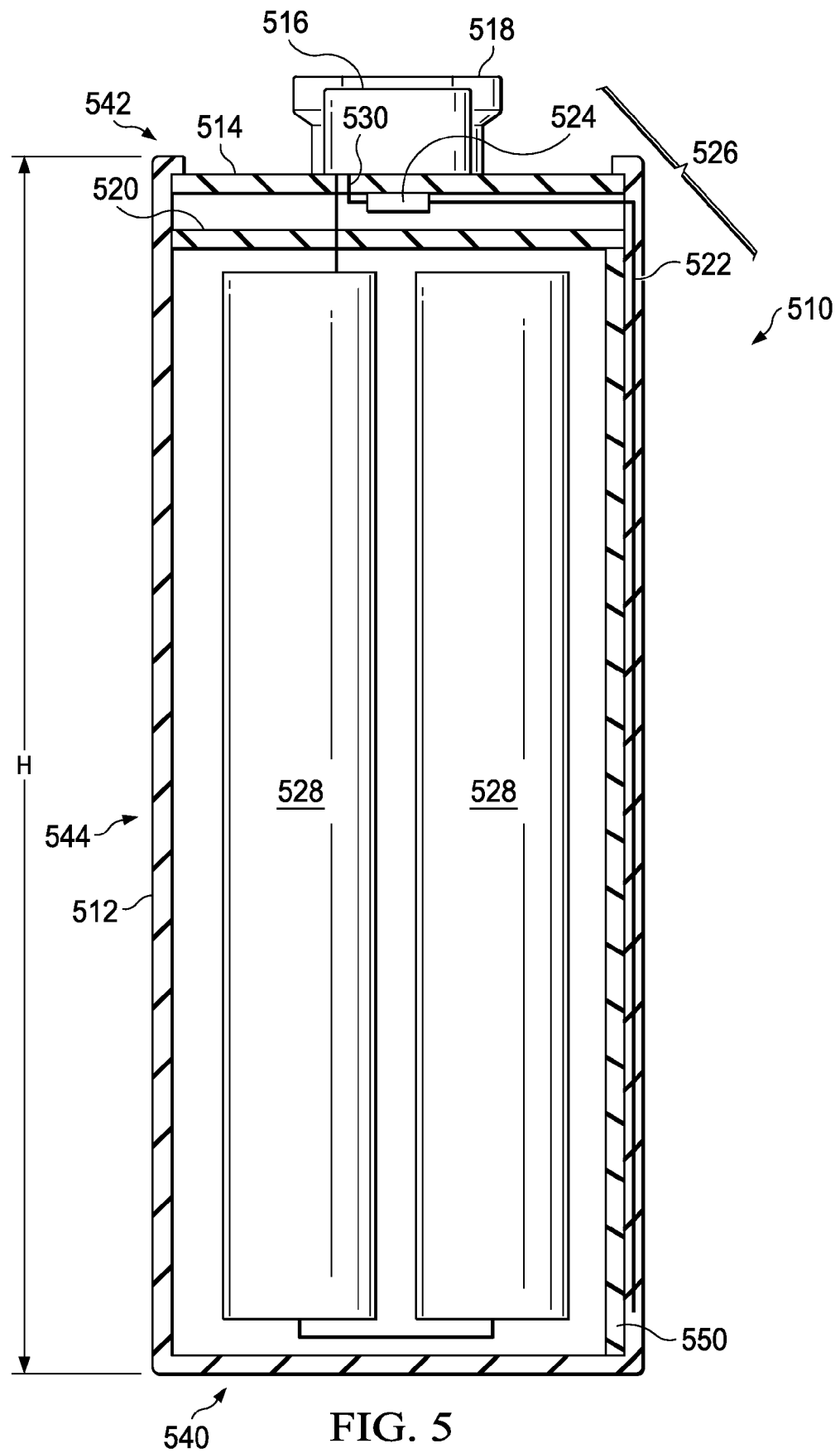
FIG. 5 is a cross-section along the length of an embodiment of a battery pack including an indicator circuit of one or more of the embodiments shown and described herein.

Referring to FIG. 5, an exemplary battery pack 510 is shown. The battery pack 510 includes a case 512; a terminal plate 514; a positive battery pack terminal 516; a negative battery pack terminal 518; an insulator 520; a magnetic diverter 550; an indicator circuit 526; and at least one electrochemical cell 528. The indicator circuit 526 includes an antenna 522 and an integrated circuit (IC) 524. The case 512 includes a closed end 540, an open end 542, and a sidewall 544 therebetween. The sidewall 544 has a height H. The terminal plate 514 is placed over the open end 542 of the case 512. The integrated circuit 524 is affixed to the terminal plate 514. The antenna 522 is integral to the case 512. The magnetic diverter 550 is affixed to the sidewall of the case 512 between the at least one electrochemical cell 528 and the antenna 522. The indicator circuit 526 is in electrical communication with the at least one electrochemical cell 528. The at least one electrochemical cell 528 is in electrical communication with the positive battery pack terminal 516 and the negative battery pack terminal 518.

Figure 6:
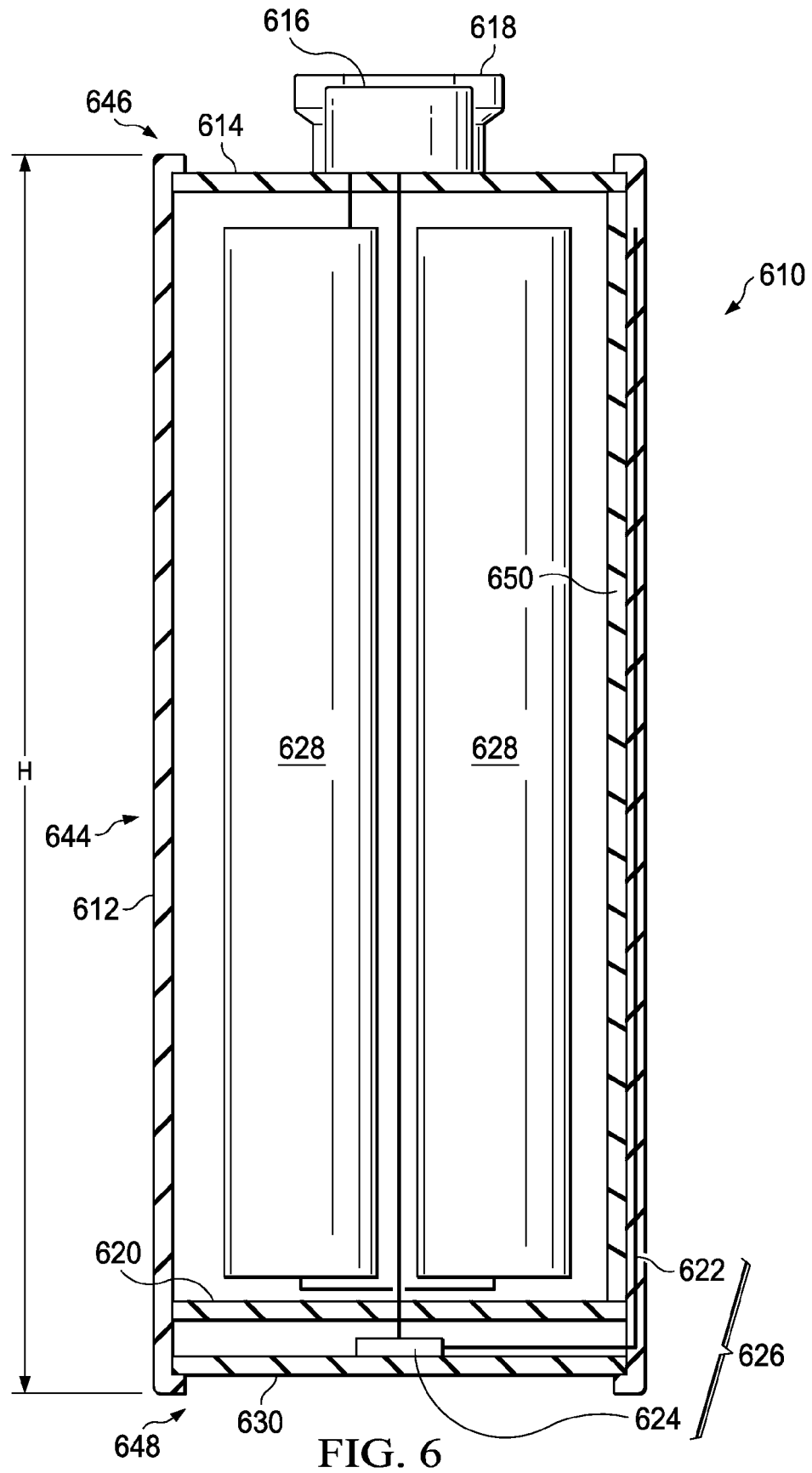
FIG. 6 is a cross-section along the length of an embodiment of a battery pack including an indicator circuit of one or more of the embodiments shown and described herein.

Referring to FIG. 6, an exemplary battery pack 610 is shown. The battery pack 610 includes a case 612; a terminal plate 614; a positive battery pack terminal 616; a negative battery pack terminal 618; an insulator 620; a base plate 630; a magnetic diverter 650; an indicator circuit 626; and at least one electrochemical cell 628. The indicator circuit 626 includes an antenna 622 and an integrated circuit (IC) 624. The case 612 includes a first open end 646, a second open end 648, and a sidewall 644 therebetween. The sidewall 644 has a height H. The terminal plate 614 is placed over the first open end 646 of the case 612. The base plate 630 is placed over the second open end 648 of the case 612. The integrated circuit 624 is affixed to the base plate 630. The antenna 622 is integral to the case 612. The magnetic diverter 650 is affixed to the sidewall 644 of the case 612 between the at least one electrochemical cell 628 and the antenna 622. The indicator circuit 626 is in electrical communication with the at least one electrochemical cell 628. The at least one electrochemical cell 628 is in electrical communication with the positive battery pack terminal 616 and the negative battery pack terminal 618.

Figure 7:
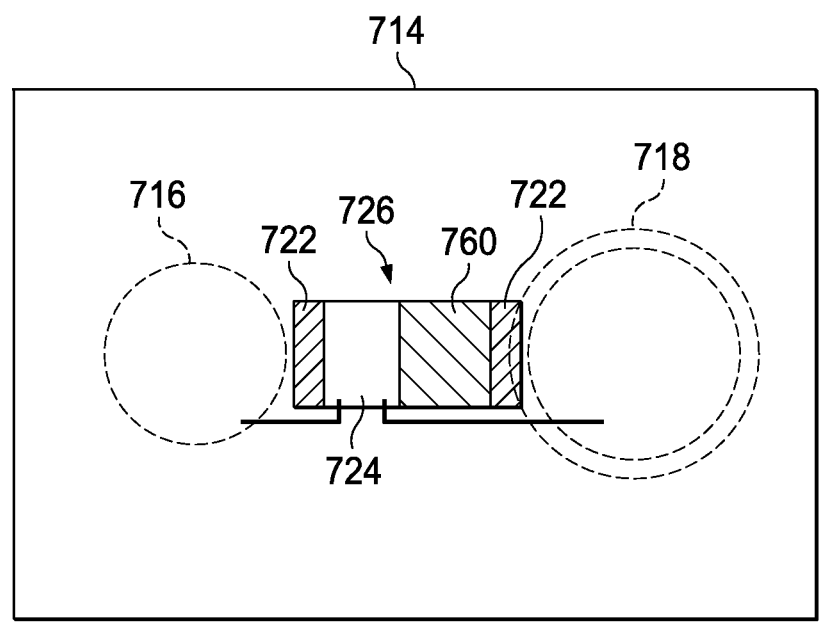
FIG. 7 is a view of a terminal plate for use within an embodiment of a battery pack including an indicator circuit of one or more of the embodiments shown and described herein.

Referring to FIG. 7, an exemplary terminal plate 714 is shown. The terminal plate 714 includes a positive battery pack terminal 716; a negative battery pack terminal 718; and an indicator circuit 726. The indicator circuit 726 includes an antenna 722; an integrated circuit (IC) 724; and a communications circuit 760. The indicator circuit 726 is in electrical communication with the positive battery pack terminal 716 and the negative battery pack terminal 718. The positive battery pack terminal 716 and the negative battery pack terminal 718 may be placed in electrical connection with at least one electrochemical cell when the terminal plate 714 is used within a battery pack.

Figure 8:
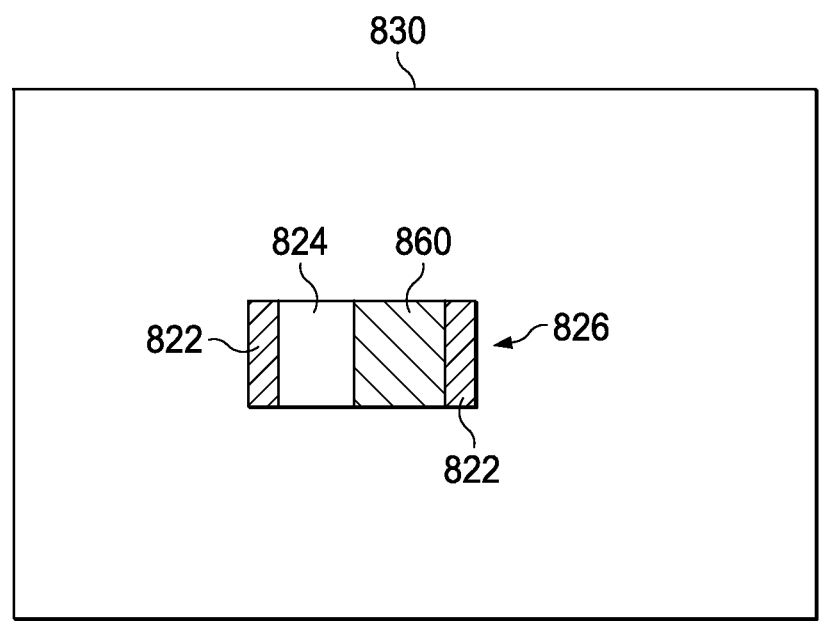
FIG. 8 is a view of a base plate for use within an embodiment of a battery pack including an indicator circuit of one or more of the embodiments shown and described herein.

Referring to FIG. 8, an exemplary base plate 830 is shown. The base plate 830 includes an indicator circuit 826. The indicator circuit 826 includes an antenna 822; an integrated circuit (IC) 824; and a communications circuit 860. The indicator circuit 826 may be placed in electrical communication with a positive battery pack terminal and a negative battery pack terminal when the base plate 830 is used within a battery pack.

Figure 9:
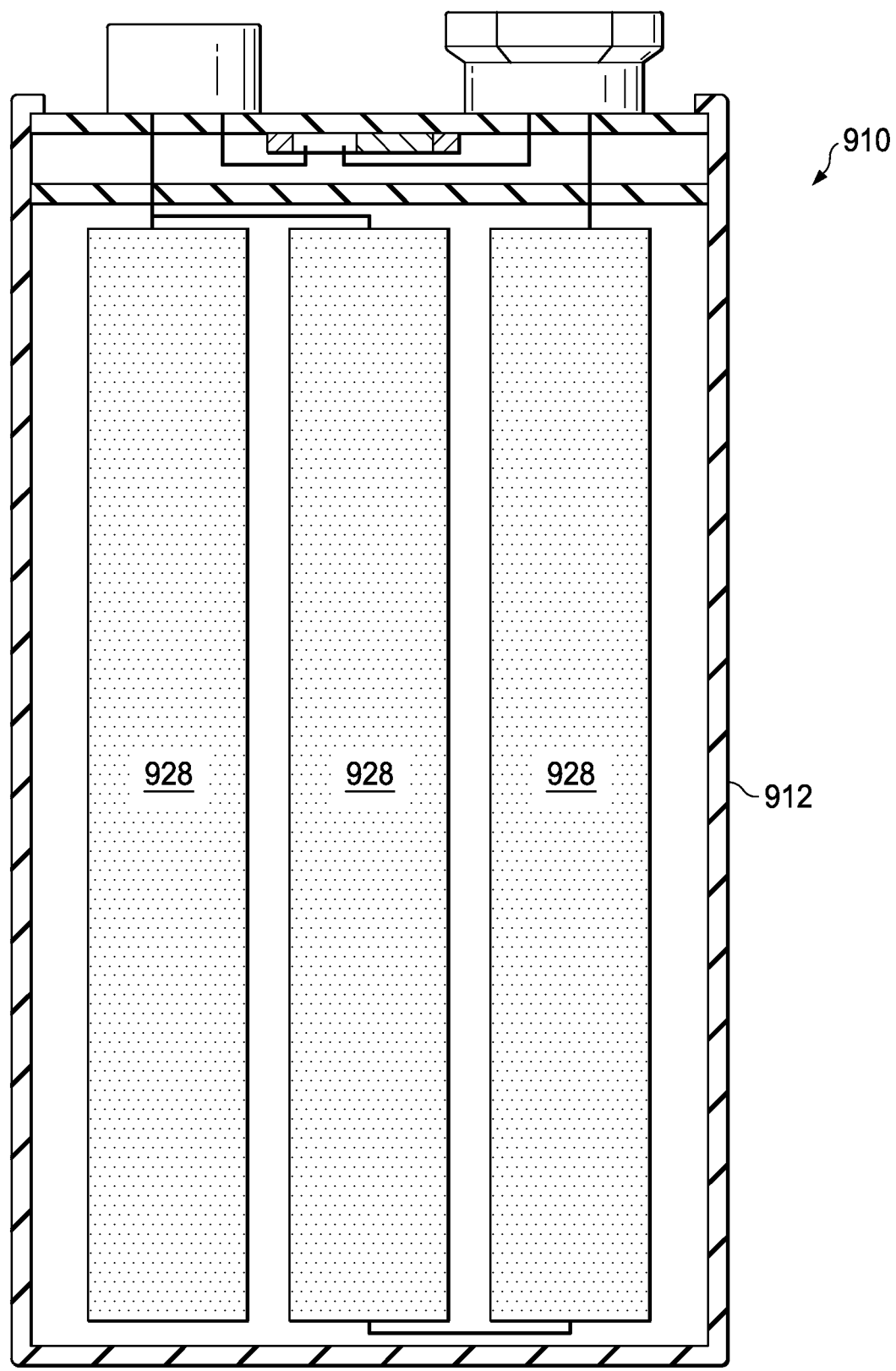
FIG. 9 is a cross-section along the width of an embodiment of a battery pack including an indicator circuit of one or more of the embodiments shown and described herein representing a volume occupied by the electrochemical cells.

Referring to FIG. 9, an exemplary volume that may be occupied by at least one electrochemical cell within a battery pack 910 is shown. The battery pack 910 includes a case 912 and at least one electrochemical cell 928. The at least one electrochemical cell 928 occupies a volume within the case 912 and the volume is represented by the dotted area. The total volume that is occupied by the at least one electrochemical cell 928 may be referred to as the total battery volume. The cross-section of the battery pack 910 in FIG. 9 shows, for example, three electrochemical cells of a total of six electrochemical cells that are within battery pack 910. In addition, the at least one electrochemical cell 928 within FIG. 9 is shown as a cylindrical cell. It should be appreciated that the representation within FIG. 9 is exemplary and in no way limits the invention in number, shape, or size of the at least one electrochemical cell within the battery pack 912.

Figure 10:
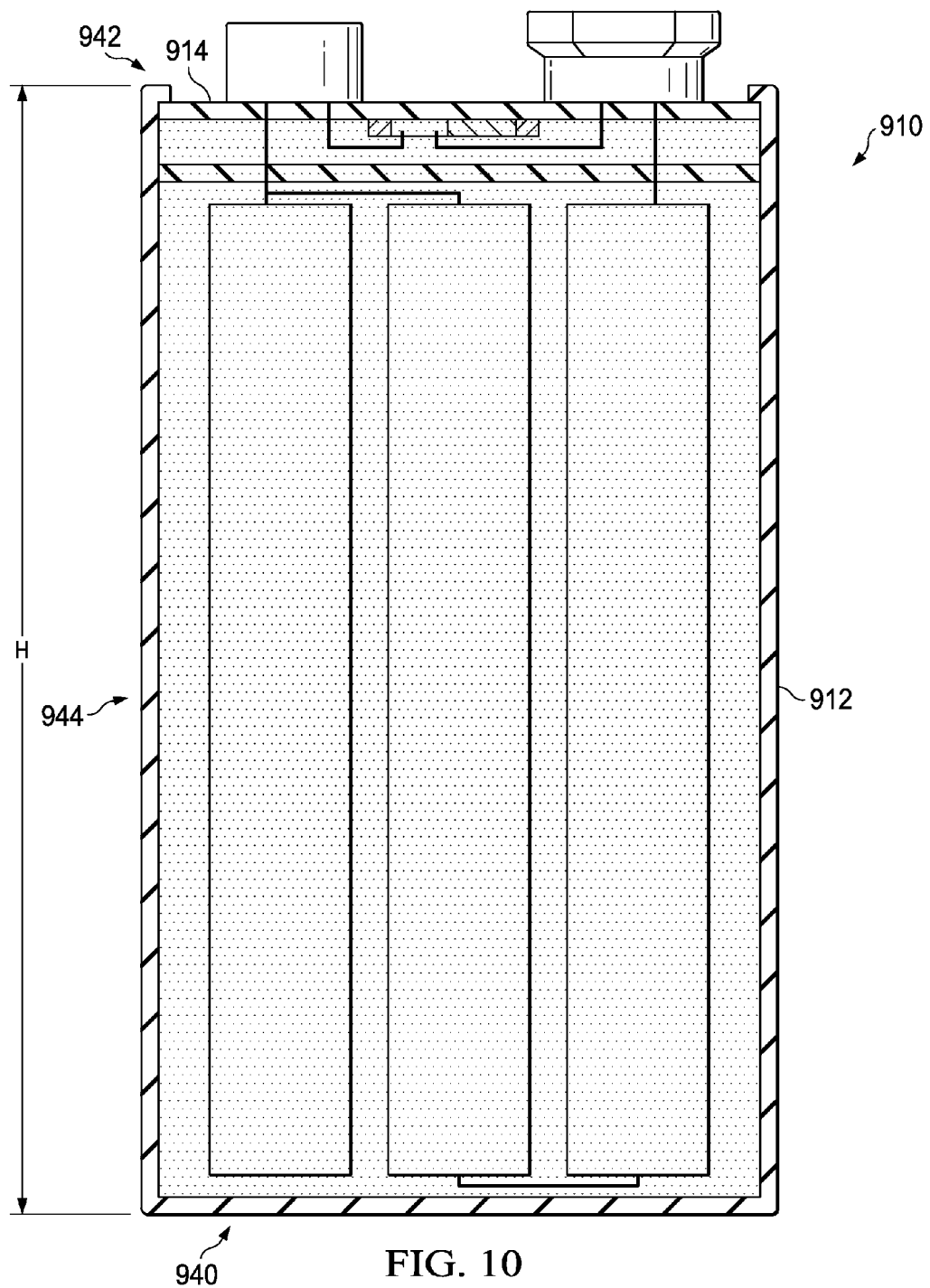
FIG. 10 is a cross-section along the width of the battery pack including an indicator circuit of FIG. 9 defining an internal volume of the battery pack.

Referring to FIG. 10, an exemplary internal volume within the battery pack 910 of FIG. 9 is shown. The battery pack 910 includes a case 912 and a terminal plate 914. The case 912 includes a closed end 940, an open end 942, and a sidewall 944 therebetween. The sidewall 944 has a height H. The terminal plate 914 is placed over the open end 942 of the case 912. The internal volume of the battery pack is defined as the space that is bounded by the terminal plate 914 that is placed over the open end 942 of the case 912; the sidewall 944 of the case 912; and the closed end 940 of the case 912. The internal volume is represented by the dotted area. In addition, the battery pack 910 within FIG. 10 is shown as a prismatic, and more specifically a rectangular, battery pack. It should be appreciated that the representation within FIG. 10 is exemplary and in no way limits the invention in shape or size of the battery pack 910.

Referring to FIGS. 9 and 10, the battery pack 910 will have a battery-to-internal volume ratio that is equal to the total volume occupied by the at least one electrochemical cell 928 divided by the internal volume of the battery pack 910.

Figure 11:
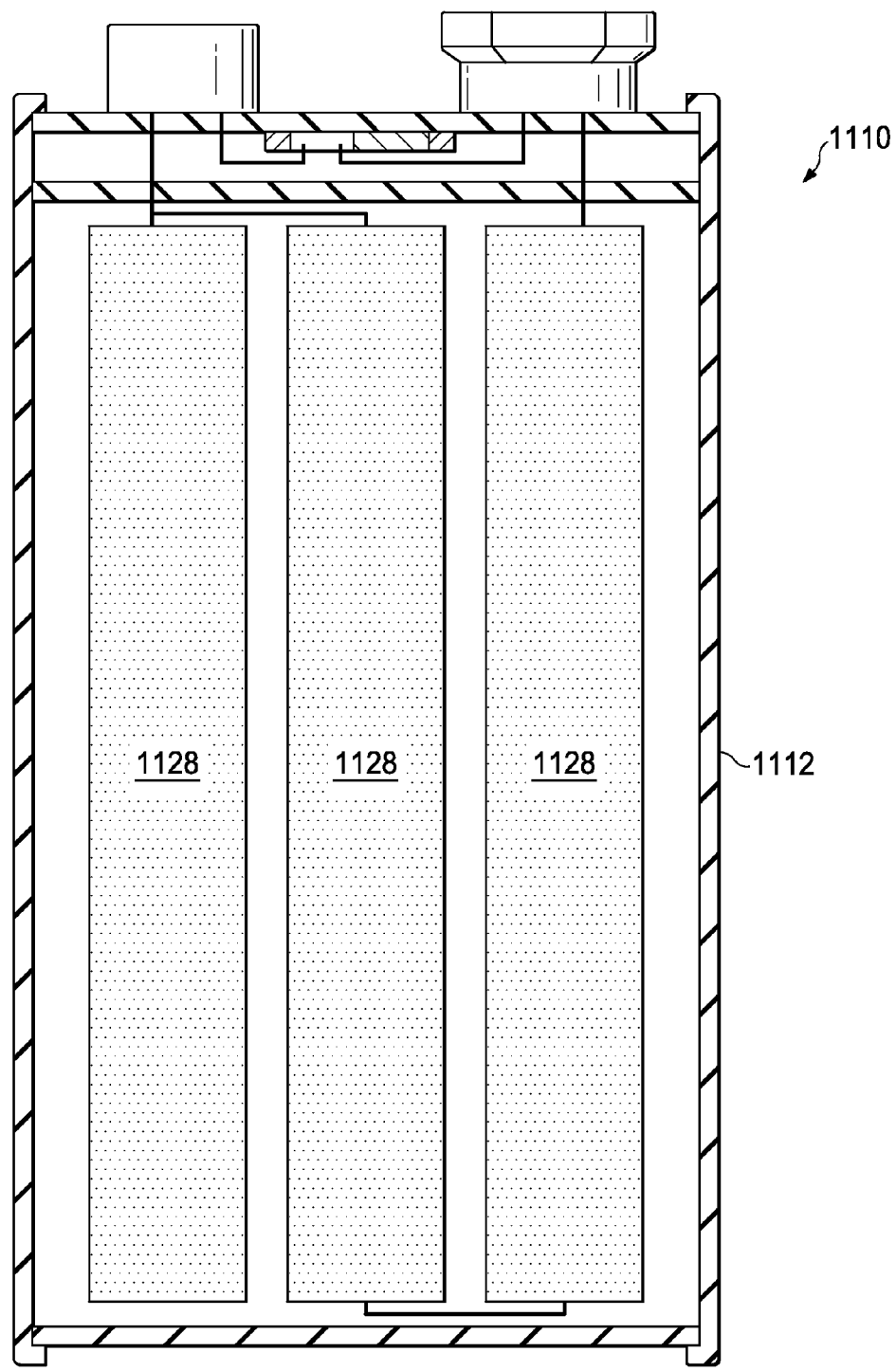
FIG. 11 is a cross-section along the width of an embodiment of a battery pack including an indicator circuit of one or more of the embodiments shown and described herein representing a volume occupied by the electrochemical cells.

Referring to FIG. 11, an exemplary volume that may be occupied by at least one electrochemical cell within a battery pack 1110 is shown. The battery pack 1110 includes a case 1112 and at least one electrochemical cell 1128. The at least one electrochemical cell 1128 occupies a volume within the battery pack 1110. The volume is represented by the dotted area. The total volume that is occupied by the at least one electrochemical cell 1128 may be referred to as the total battery volume. The cross-section of the battery pack 1110 shows, for example, three electrochemical cells of a total of six electrochemical cells that are within battery pack 1110. In addition, the at least one electrochemical cell 1128 is shown as a cylindrical cell. It should be appreciated that the representation within FIG. 11 is exemplary and in no way limits the invention in number, shape, or size of the at least one electrochemical cell within the battery pack 1110.

Figure 12:
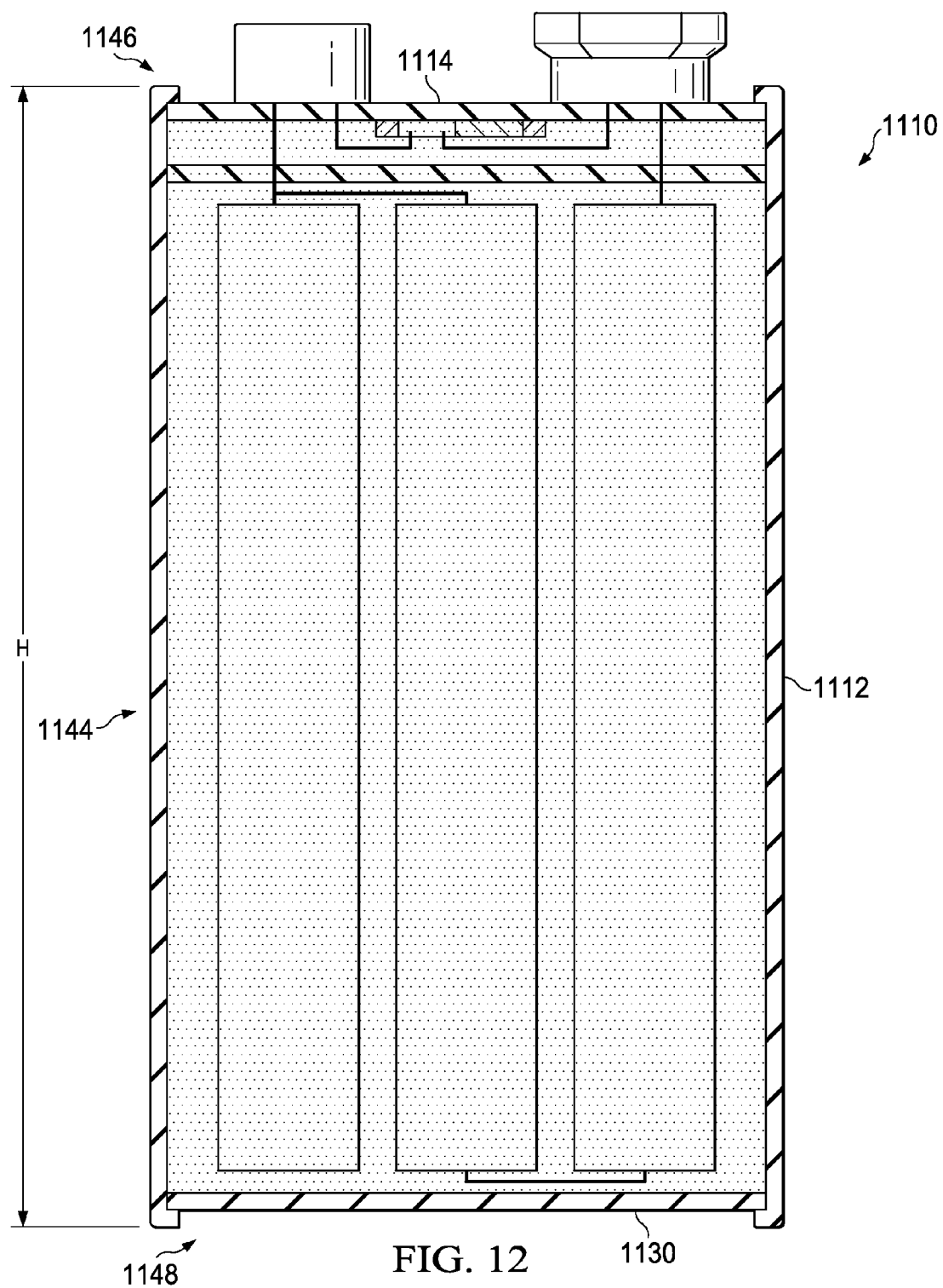
FIG. 12 is a cross-section along the width of the battery pack including an indicator circuit of FIG. 11 defining an internal volume of the battery pack.

Referring to FIG. 12, an exemplary internal volume within the battery pack 1110 of FIG. 11 is shown. The battery pack 1110 includes a case 1112, a terminal plate 1114, and a base plate 1130. The case 1112 includes a first open end 1146, a second open end 1148, and a sidewall 1144 therebetween. The sidewall 1144 has a height H. The terminal plate 1114 is placed over the first open end 1146 of the case 1112. The base plate 1130 is placed over the second open end 1148 of the case 1112. The internal volume of the battery pack is defined as the space that is bounded by the terminal plate 1114 that is placed over the first open end 1146 of the case 1112; the base plate 1130 that is placed over the second open end 1148 of the case 1112; and the sidewall 1144 of the case 1112. The internal volume is represented by the dotted area. In addition, the battery pack 1110 within FIG. 12 is shown as a prismatic, and more specifically a rectangular, battery pack. It should be appreciated that the representation within FIG. 12 is exemplary and in no way limits the invention in shape or size of the battery pack 1110.

Referring to FIGS. 11 and 12, the battery pack 1110 will have a battery-to-internal volume ratio that is equal to the total volume occupied by the at least one electrochemical cell 1128 divided by the internal volume of the battery pack 1110.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A battery pack comprising:
   at least one electrochemical cell;
   a case, the case comprising a first open end, a second open end, and a sidewall therebetween;
   a terminal plate placed over the first open end, and a base plate placed over the second open end;
   an indicator circuit, the indicator circuit comprising an integrated circuit and an antenna; and
   the integrated circuit is affixed to the base plate;
   wherein the battery pack has a battery-to-internal volume ratio greater than about 0.52.

2. The battery pack of claim 1, further comprising a magnetic diverter, the magnetic diverter therebetween the at least one electrochemical cell and the antenna.

3. The battery pack of claim 1, wherein the indicator circuit comprises a communications circuit, the communications circuit comprising radio-frequency identification circuitry; near field communication circuitry; Bluetooth circuitry; Bluetooth Low Energy circuitry; Wi-Fi circuitry; or Zigbee circuitry.

4. The battery pack of claim 1, wherein the case comprises a non-conductive material, a non-metallic material, or any combination thereof.

5. The battery pack of claim 1, wherein the at least one electrochemical cell is in electrical connection with the terminal plate and the indicator circuit.

6. The battery pack of claim 1, wherein the antenna is incorporated within a printed circuit board.

7. The battery pack of claim 1, wherein the antenna is incorporated within the case.

8. The battery pack of claim 1, wherein the battery pack is selected from the group consisting of an ANSI 1604 battery; an ANSI 7.2H5 battery; an ANSI 7.2K5 battery; an ANSI 8.4H5 battery; and an ANSI 8.4K5 battery.

9. The battery pack of claim 1, wherein the battery-to-internal volume ratio is from about 0.52 to about 0.98.

* * * * *